US011615492B2

(12) United States Patent
Brooke et al.

(10) Patent No.: US 11,615,492 B2
(45) Date of Patent: Mar. 28, 2023

(54) SYSTEMS AND METHODS FOR IDENTIFYING A RISK OF IMPLIEDLY OVERRULED CONTENT BASED ON CITATIONALLY RELATED CONTENT

(71) Applicant: Thomson Reuters Enterprise Centre GmbH, Zug (CH)

(72) Inventors: Julian Brooke, Vancouver (CA); Kanika Madan, Toronto (CA); Hector Martinez Alonso, Cambridge (GB); Afsaneh Fazly, Markham (CA); Tonya Custis, Minneapolis, MN (US); Isabelle Moulinier, Richfield, MN (US); Gayle McElvain, Arlington, VA (US); Diane Erickson, Woodbury, MN (US); Khaled Ammar, Waterloo (CA)

(73) Assignee: Thomson Reuters Enterprise Centre GmbH, Zug (CH)

( * ) Notice: Subject to any disclaimer, the term of this patent is extended or adjusted under 35 U.S.C. 154(b) by 904 days.

(21) Appl. No.: 16/411,809

(22) Filed: May 14, 2019

(65) Prior Publication Data

US 2019/0347748 A1 Nov. 14, 2019

Related U.S. Application Data

(60) Provisional application No. 62/671,076, filed on May 14, 2018.

(51) Int. Cl.
*G06F 17/00* (2019.01)
*G06Q 50/18* (2012.01)
(Continued)

(52) U.S. Cl.
CPC ............ *G06Q 50/18* (2013.01); *G06F 16/285* (2019.01); *G06F 16/353* (2019.01); *G06F 40/30* (2020.01)

(58) Field of Classification Search
CPC ..... G06Q 50/18; G06F 16/285; G06F 16/353; G06F 40/30; G06K 9/623; G06K 9/6281
See application file for complete search history.

(56) References Cited

U.S. PATENT DOCUMENTS 6,263,351 B1 7/2001 Wolfe
7,778,954 B2 8/2010 Rhoads et al.
(Continued)

FOREIGN PATENT DOCUMENTS

WO WO-2007/009054 A2 1/2007

OTHER PUBLICATIONS

Ashley, Kevin D., and Stefanie Brüninghaus. "Automatically classifying case texts and predicting outcomes." Artificial Intelligence and Law 17.2 (2009): 125-165 (Year: 2009).*
Chalkidis, Ilias, and Dimitrios Kampas. "Deep learning in law: early adaptation and legal word embeddings trained on large corpora." Artificial Intelligence and Law 27.2: 171-198 (Year: 2018).*
(Continued)

*Primary Examiner* — Andrew T McIntosh
(74) *Attorney, Agent, or Firm* — Norton Rose Fulbright US LLP (57) ABSTRACT

The present disclosure relates to systems and methods for analyzing citationally related content and identifying, based on the analysis, a risk of impliedly overruled content. Embodiments provide for receiving case law data from a document source, for extracting a case triple that includes a first case overruling or abrogating a second case, and a third case citationally related to the second case. Features may be generated from case triple, such as natural processing language features comparing the language in the various cases of the triple, and feeding the generated features to a main classifier. In embodiments, the main classifier classifies the
(Continued)

case triple into a class indicating the risk probability that the second case is impliedly overruled by the first case.

20 Claims, 4 Drawing Sheets

(51) Int. Cl.
  *G06F 16/28* (2019.01)
  *G06F 16/35* (2019.01)
  *G06F 40/30* (2020.01)

(56) References Cited

U.S. PATENT DOCUMENTS

| | | | |
|---|---|---|---|
| 7,814,102 | B2 | 10/2010 | Miller |
| 8,250,118 | B2 | 8/2012 | Rhoads et al. |
| 9,916,365 | B1* | 3/2018 | Dick ................ G06F 16/382 |
| 2009/0313316 | A1 | 12/2009 | Kemp |
| 2010/0125601 | A1 | 5/2010 | Jackson et al. |
| 2011/0208769 | A1* | 8/2011 | Kemp ................ G06F 16/382 |
| | | | 707/769 |
| 2011/0289105 | A1* | 11/2011 | Hershowitz .......... G06F 40/169 |
| | | | 707/769 |
| 2013/0246290 | A1 | 9/2013 | Courson et al. |
| 2013/0297540 | A1 | 11/2013 | Hickok |
| 2017/0060993 | A1* | 3/2017 | Pendar ................ G06F 16/334 |
| 2017/0308976 | A1 | 10/2017 | Eidelman et al. |
| 2019/0197431 | A1* | 6/2019 | Gopalakrishnan ..... G06N 5/045 |

OTHER PUBLICATIONS

Slingerland, Roos, Alexander Boer, and Radboud Winkels. "Analysing the Impact of Legal Change Through Case Classification." JURIX. 2018 (Year: 2018).*

Brüninghaus, S. et al. "Predicting Outcomes of Case-based Legal Arguments," ICAIL '03: Proceedings of the 9th Interntional Conference on Artificial Intelligence and Law, ACM Press, Jun. 2003, pp. 233-242, 110 pages.

Jackson, P. et al. "Information Extraction from Case Law and Retrieval of Prior Cases," Artificial Intelligence, vol. 150, 2003, pp. 239-290, 52 pages.

Australian Government, IP Australia, Examination Report No. 1 issued for Australian Patent Application No. 2019269566, dated Feb. 10, 2022, 4 pages.

Citators, Catch a Little R & R, Research Redux, CITATORS: Shepard's & KeyCite, "Is my case still good?" (Mar. 26-Apr. 12), Retrieved on [Aug. 27, 2019]. Retrieved from: < URL: https://www3.nd.edu/-lawlib/students/redux/Citators.pdf>; 28 pages.

International Search Report and Written Opinion issued for PCT Application No. PCT/IB2019/054000, dated Sep. 16, 2019, 8 pages.

Canadian Intellectual Property Office, Office Action issued for Canadian Patent Application No. 3,099,632, dated Nov. 23, 2022, 4 pages.

* cited by examiner

SYSTEMS AND METHODS FOR IDENTIFYING A RISK OF IMPLIEDLY OVERRULED CONTENT BASED ON CITATIONALLY RELATED CONTENT

CROSS-REFERENCE TO RELATED APPLICATION

The present application claims priority to U.S. Provisional Application No. 62/671,076, filed May 14, 2018, and entitled, "LEGAL RESEARCH CITATION SYSTEM," the disclosure of which is incorporated by reference herein in its entirety.

TECHNICAL FIELD

The present subject matter is directed generally to data identification, and more particularly to identifying a risk of content impliedly affected by treatment of other content.

BACKGROUND

Many documents rely on the content of other documents when making assertions or providing conclusions. For example, in a first legal case treating a legal issue or point of law, the legal case may rely on a decision or treatment of the issue in a second case. In this sense, the first case may cite to the second case. Many other cases may also cite to the second case. However, the second case may be overruled by a third case, or the third case may negatively treat the legal issue for which the second case may have been cited. In this case, the first case may be affected, as it may deal with the same legal issue, but there may not be an explicit indication that the first case may have been affected because the first case has not been explicitly overruled. In this situation, a lawyer may rely on the first case, which has not been explicitly overruled, unaware that the legal issue in the first case has received negative treatment.

Current citation systems lack functionality to address the above situation. Although current systems may be able to identify explicitly overruled cases and flag them, when a case has not been explicitly overruled, or when a case including a legal issue that has received negative treatment in another case without explicitly overruling the case, current systems are not able to identify and/or flag those impliedly overruled cases.

SUMMARY

The present application relates to systems and methods for analyzing citationally related content and identifying, based on the analysis, a risk of impliedly overruled content. In aspects, data may be extracted from various items of the content and a citational relationship between the various items may be determined. Features may be generated from the extracted data, such as features comparing the language in the various items and determining the level of the citational relationship, and the generated features may be fed into a main classifier. In embodiments, the main classifier may facilitate determining a risk (e.g., a risk score, probability, etc.) that a particular content item may be impliedly overruled. For example, a first legal case may overrule a second case, where the second case may be citationally related to a third case. In embodiments of the present disclosure, the first, second, and third cases may be processed to determine the level of risk that the third case may be impliedly overruled.

It is noted that as used herein, "impliedly overruled" refers to the situation where a third case, while not being explicitly overruled by a first case, is negatively impacted by the decision and/or treatment in another case (e.g., an overruling and/or overruled case). In this instance, the points of law in the impliedly overruled case may be the same points of law, or may be points of law treated similarly, as the points of law in the overruled case. As will be appreciated, because a case may have been overruled by an overruling case, or because the point of law in the overruled case may have received negative treatment in the overruling case (e.g., an overruling case overrules or abrogates the overruled case, or where the overruling case disagrees with, disapproves of, and/or rejects the overruled case or the point of law), then the point of law in the impliedly overruled case, which may be the same point of law, may no longer be good law, and instead may also receive negative treatment. Additionally, as used herein, a citational relationship may refer to the relationship between two documents and may include at least one of: a first document being cited by a second document, the first document citing the second document, and the first and second document relying on or treating the same point of law. In either of these cases, the first and the second document may be said to be citationally related. In some cases, the first and second document may rely on or treat the same point of law without one case explicitly citing or mentioning the other case.

It is also noted that, although the discussion that follow is directed to embodiments in the legal field involving legal cases, it will be appreciated that aspects disclosed herein are applicable to any situation in which documents, content, and/or any type of data may be related to each other, such as by a citational relationship or a validity relationship (e.g., a first document may be deemed valid based on the validity of a second document), such as with documents, articles, books, legislation, court opinions, patents, legal filings, etc. As such, the discussion herein with respect to legal cases and court opinions is for illustrative purposes and should not be construed as limiting in any way.

In one particular embodiment, a method includes receiving case law data from at least one case law document data source, and extracting an (X, O, A) triple from the case law data. The (X, O, A) triple includes a first case (X), a second case (O), and third case (A), the third case (A) being citationally related to the second case (O), and the second case (O) receiving negative treatment from the first case (X). The method also includes extracting at least one feature from the (X, O, A) triple, feeding the extracted at least one feature to a main classifier, and generating, by the main classifier, a classification for the (X, O, A) triple based on the extracted feature. The classification for the (X, O, A) triple includes one of an N-classification indicating a low probability that the third case (A) is impliedly overruled by the first case (X), and a D-classification indicating a high probability that third case (A) is impliedly overruled by the first case (X).

In another embodiment, a system may be provided. The system may include a data extractor configured to receive case law data from at least one case law document data source, and to extract an (X, O, A) triple from the case law data. The (X, O, A) triple includes a first case (X), a second case (O), and third case (A), the third case (A) being citationally related to the second case (O), and the second case (O) receiving negative treatment from the first case (X). The system also includes a feature generator configured to extract at least one feature from the (X, O, A) triple, and to feed the extracted at least one feature to a main classifier, and the main classifier configured to generate a classification for the (X, O, A) triple based on the extracted feature. The classification for the (X, O, A) triple includes one of an N-classification indicating a low probability that the third case (A) is impliedly overruled by the first case (X), and a D-classification indicating a high probability that third case (A) is impliedly overruled by the first case (X).

In yet another embodiment, a computer-based tool may be provided. The computer-based tool may include non-transitory computer readable media having stored thereon computer code which, when executed by a processor, causes a computing device to perform operations that include receiving case law data from at least one case law document data source, and extracting an (X, O, A) triple from the case law data. The (X, O, A) triple includes a first case (X), a second case (O), and third case (A), the third case (A) being citationally related to the second case (O), and the second case (O) receiving negative treatment from the first case (X). The operations also include extracting at least one feature from the (X, O, A) triple, feeding the extracted at least one feature to a main classifier, and generating, by the main classifier, a classification for the (X, O, A) triple based on the extracted feature. The classification for the (X, O, A) triple includes one of an N-classification indicating a low probability that the third case (A) is impliedly overruled by the first case (X), and a D-classification indicating a high probability that third case (A) is impliedly overruled by the first case (X).

The foregoing broadly outlines the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Figure 1:
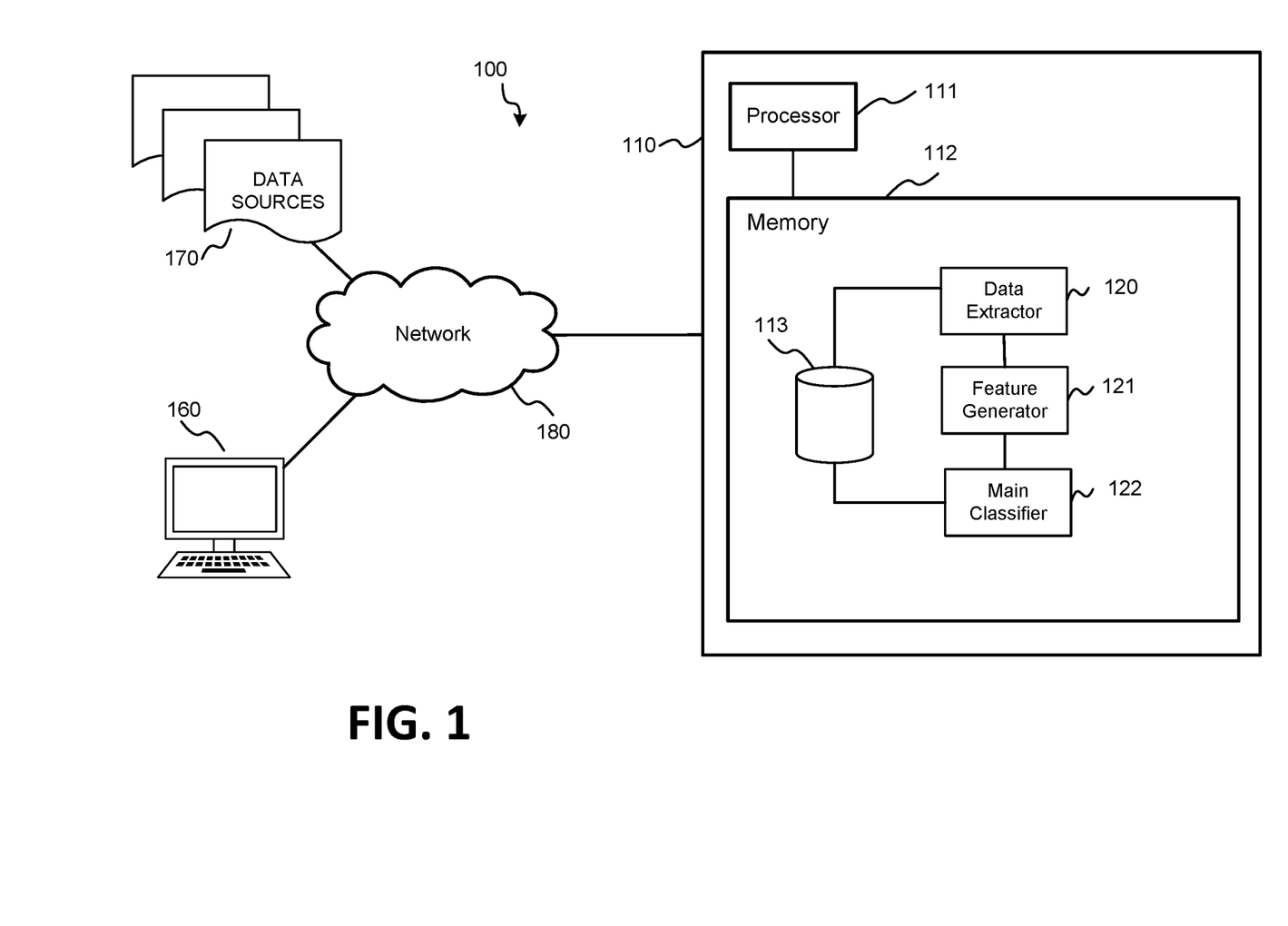
FIG. 1 shows a system configured to perform operations in accordance with embodiments of the present disclosure.

FIG. 1 is a block diagram of an exemplary system 100 configured with capabilities and functionality for analyzing citationally related content and identifying, based on the analysis, a risk of impliedly overruled content. In aspects, as noted above, the content may related to legal cases. In some embodiments, case law documents may be received from a data source, and data related to the cases may be extracted to determine a candidate citationally related cases, and to generate case triples. Features may be generated from the case triple, and the extracted features may fed into a main classifier. In embodiments, the main classifier may facilitate determining a risk (e.g., a risk score, probability, etc.) that a particular case may be impliedly overruled. It is noted that, as used herein, a triple may refer to a combination of three cases. For example, in embodiments, a triple may include a first case (X), a second case (O), and third case (A), wherein the first case overrules or abrogates the second case, or wherein the first case disagrees with, disapproves of, and/or otherwise rejects the second case, and wherein the third case cites, is cited by, and/or relies on the same point of law as the second case. The present disclosure may use the terminology (X, O, A) to refer to such triples in some examples.

It is noted that although the terminology used herein refers to an (X, O, A) triple, in some implementations, other terminology may be used. For example, in some implementations, a case (X) may refer to a case that explicitly invalidates a case (O), or that provides negative treatment of a particular point of law. In these cases, a case (A) may refer to a case that is decided or relies upon the particular point of law relying on case (O) as authority for the particular point of law. A case (B) may refer to a case that is decided or relies upon the particular point of law relying on case (C) as authority for the particular point of law. In this instance, case (O) may rely upon case (C) as authority for the particular point of law. Case (C) may be a case decided or relying upon the particular point of law. In this example, as will be appreciated, case (A) relies upon case (O) as authority for the point of law, case (O) relies upon case (B) as authority for the point of law, case (B) relies upon case (C) as authority for the point of law, case (C) is decided based on the particular point of law, and case (O) is overruled, invalidated, abrogated, and/or otherwise receives negative treatment with respect to the particular point of by case (X). In other examples, a case (D) may refer to a case that is decided or relies upon the particular point of law relying on case (E) as authority for the particular point of law, but without citing, or otherwise mentioning, case (O). Case (E)

may be a case decided or relying upon the particular point of law without citing, or otherwise mentioning, case (O). As will be appreciated, the various aspects disclosed herein are applicable to determine a risk of impliedly overruled cases and or points of law with respect to any triple combination in the foregoing examples. For example, the functionality disclosed herein may be applied to determine the risk of implied overruling for any of triples (X, O, A), (X, O, B), (X, O, C), (X, O, D), and/or (X, O, E). As will be further appreciated, the functionality may be applicable to triples even further out in the chain of citational relationships, or other cases relaying upon the same point of law. Thus, herein, an (X, O, A) triple may be any triple of triples (X, O, A), (X, O, B), (X, O, C), (X, O, D), and/or (X, O, E), and/or any other triple of citationally related cases.

In implementations, the main classifier may classify a triple not impacted by the overruling as "N," and may classify a triple likely impacted by the overruling as "D." As noted above, a "D" label may indicate that the (A) case is likely impacted by case (X) overruling case (O), and the likelihood of the impact on (A) is a probability given by the main classifier.

As shown in FIG. 1, system 100 includes server 110, at least one user terminal 160, at least one data source 170, and network 180. These components, and their individual components, may cooperatively operate to provide functionality in accordance with the discussion herein. These components, and their individual components, may cooperatively operate to provide functionality in accordance with the discussion herein. For example, in operation according to embodiments, case law documents may be obtained from data feeds 180 and may be provided as input to server 110. The various components of server 110 may cooperatively operate to extract case data from the case law documents from data sources 170 and to apply customized machine learning algorithms and classifiers to extract features from the case data, and to identify a risk of impliedly overruled cases. An indication of the risk of impliedly overruled cases may then be provided to a user of system 100. In aspects, the functionality of system 100 may be implemented using an approach that may rely upon a point of law for which cases cite explicitly overruled cases, and may also rely upon language around the citation of the point of law in the potentially affected cases (e.g., a case citing an overruled case or cited by an overruled case) to determine whether the potentially affected case is distinguished from the overruled case. As such, various aspects of the present disclosure allow extending the functionality of citation systems beyond explicit citing relationships.

It is noted that the functional blocks, and components thereof, of system 100 of embodiments of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for preforming the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such aspects, the functionality of each respective component may be aggregated from the functionality of multiple modules residing in a single, or in multiple devices.

In some aspects, server 110, user terminal 160, and data sources 170 may be communicatively coupled via network 180. Network 180 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc., that may be configured to facilitate communications between user terminal 160 and server 110.

User terminal 160 may be implemented as a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. User terminal 160 may be configured to provide a graphical user interface (GUI) via which a user may be provided with information related to the citational relationship between cases, as well as an indication of impliedly overruled cases. In some embodiments, the indication of impliedly overruled cases may include an indication of the probability that a case has been impliedly overruled. The indication may be associated with the case (e.g., may be displayed in a location of the GUI associated with the case, and may include a flag, a particular color flag (e.g., an orange flag, or a flag of any other color), a value (e.g., a probability value, a percentage, etc.), a letter grade, and/or any other type of indication that conveys to a user that there is a probability that the case may have been impliedly overruled (e.g., a legal issue discussed within the case may have received negative treatment).

Data sources 170 may comprise at least one source of case law-related data. Case law-related data may include any data that includes information related to cases, and may include tables containing case law documents, editorial analysis, key numbers, legal blogs, court opinion reporting systems, third party case law sources, etc. In some embodiments, editorial analysis may include headnotes. Headnotes may refer to editorially created summaries of the law addressed in court opinions. Key number may include key numbers of a research taxonomy. For example, the Westlaw Key Number System is a legal taxonomy with over 120K fine-grained categories. In aspects, headnotes may be assigned a key number assigning a point of law to one or more categories. An example of a system for classification and usage of headnotes and key number within the context of legal research is described in pending application Ser. No. 16/402,100, filed May 2, 2019, and entitled, "SYSTEMS AND METHODS FOR GENERATING A CONTEXTUALLY AND CONVERSATIONALLY CORRECT RESPONSE TO A QUERY," the disclosure of which is incorporated by reference herein in its entirety.

Server 110 may be configured to receive case law data from data sources 170, to apply customized natural language processing algorithms and classifiers to extract features from the case data, and to identify a risk of impliedly overruled cases from the case law data. This functionality of server 110 may be provided by the cooperative operation of various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. In some embodiments, server 110 may be implemented, wholly or in part, on an on-site system, or on a cloud-based system.

As shown in FIG. 1, server 110 includes processor 111, memory 112, database 113, data extractor 120, feature generator 121, and main classifier 122. It is noted that the various components of server 110 are illustrated as single and separate components in FIG. 1. However, it will be appreciated that each of the various components of server 110 may be a single component (e.g., a single application, server module, etc.), may be functional components of a same component, or the functionality may be distributed over multiple devices/components. In such aspects, the functionality of each respective component may be aggregated from the functionality of multiple modules residing in a single, or in multiple devices.

In some aspects, processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, implementations of processor 111 may comprise code segments (e.g., software, firmware, and/or hardware logic) executable in hardware, such as a processor, to perform the tasks and functions described herein. In yet other aspects, processor 111 may be implemented as a combination of hardware and software. Processor 111 may be communicatively coupled to memory 112.

Memory 112 may comprise read only memory (ROM) devices, random access memory (RAM) devices, one or more hard disk drives (HDDs), flash memory devices, solid state drives (SSDs), other devices configured to store data in a persistent or non-persistent state, network memory, cloud memory, local memory, or a combination of different memory devices. Memory 112 may store instructions that, when executed by processor 111, cause processor 111 to perform operations in accordance with the present disclosure. In aspects, memory 112 may also be configured to facilitate storage operations. For example, memory 112 may comprise database 113 for storing analysis data, models, classifiers, rankers, usage metrics, analytics, user preferences, headnotes, headnotes analyses, key numbers, etc., which system 100 may use to provide the features discussed herein. Database 113 may be integrated into memory 112, or may be provided as a separate module. In some aspects, database 113 may be a single database, or may be a distributed database implemented over a plurality of database modules. In some embodiments, database 113 may be provided as a module external to server 110.

Data extractor 120 may be configured to process case law documents received from data sources 170, to extract case law data from the case law documents, and to generate triples for further analysis by various components of server 110. It is noted that the functionality of data extractor 120 to extract case law data and generate triples may be used during classifier training operations and/or during runtime operations. As used herein, runtime operations may refer to operations of the system during a user session in which the system may provide a user with a risk probability of an impliedly overruled case. In that sense, training operations facilitate training of the classifier so that the classifier may learn to identify impliedly overruled cases, and runtime operations facilitate application of the trained classifier to identify impliedly overruled cases and to provide users with the identification.

Figure 2:
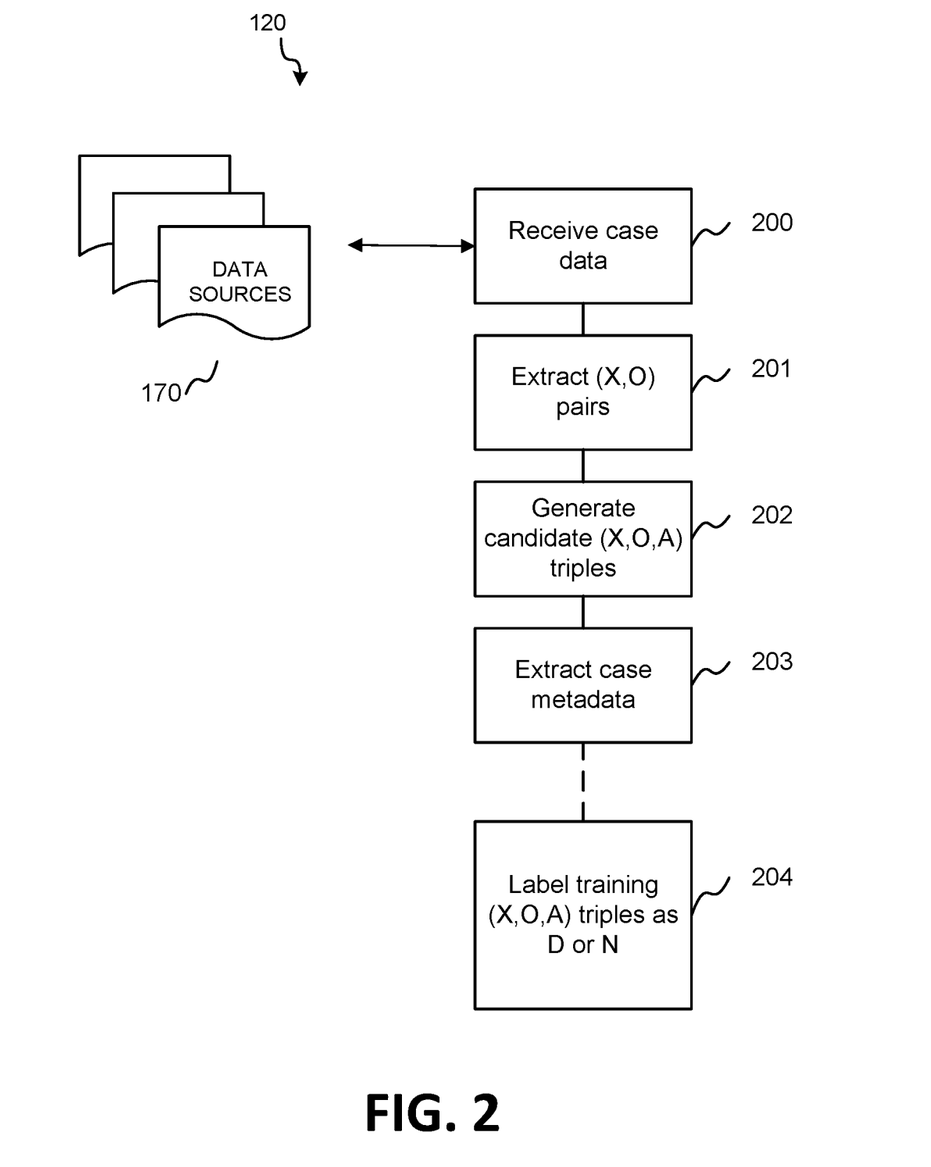
FIG. 2 shows a flow diagram illustrating functionality of a data extractor implemented in accordance with aspects of the present disclosure.

The functionality of data extractor 120 will now be discussed with respect to the block diagram illustrated in FIG. 2. FIG. 2 shows a flow diagram illustrating functionality of data extractor 120 for analyzing and processing case law documents, for extracting case law data from the case law documents, and for generating triples from the case law data. At block 200, at least one case law document containing case law data is received. For example, case law documents may be received from data sources 170. As noted above, the received case law documents may include case decisions and/or court opinions, and may discuss and/or rely upon particular legal issues or points of law. In some cases, one case may cite another case, and/or both cases may discuss and/or rely upon the same point of law. In aspects, a case may cite another case for a particular point of law. In addition, the case law documents may include cases overruling another case or cases, and/or giving negative treatment to a particular point of law, which point of law may be recited in another case.

In a particular embodiment in which system 100 operates to train the machine learning models and classifiers, the case law data received from data sources 170 may be annotated data. The annotated data may be editorially annotated, such as by annotators, trained attorneys, subject matter experts, etc., or may be data annotated using machine learning algorithms. In some cases, the annotated data may be annotated using feedback during runtime operations. In aspects, as will be discussed in more detail below, the annotated data may be used to train the classifiers. In other aspects, the annotation of the data may be performed by data extractor 120, in accordance with the description herein.

At block 201, (X, O) pairs are extracted from the case law data. In aspects, as discussed above, case (X) may be an overruling case in which case (O) may be overruled. Extracting the (X, O) pairs may include identifying cases which explicitly overrule other cases. The identification may be done manually or may be done using natural language processing or machine learning algorithm. This identification may be straightforward as the overruling case may explicitly overrule the overruled case.

At block 202, candidate (X, O, A) triples may be extracted. In aspects, case (A) may be a case citing case (O), may be a case cited by case (O), or may be a case relying upon the same point of law as in case (O). In that sense, case (A) may potentially be affected by the overruling of case (O). As described above in more detail, the (X, O, A) triple may be any of triples (X, O, A), (X, O, B), (X, O, C), (X, O, D), and/or (X, O, E), and/or any other triple of citationally related cases. In aspects, as will be described in more detail below, the determination as to whether case (A) cites case (O) in reliance of some point of law may be done by an established law classifier. At this point, what is known is that case (A) may include a citation to case (O) in the candidate (X, O, A) triple, case (O) may include a citation to case (A), and/or case (A) relies upon the same point of law for which case (O) was overruled, abrogated, and/or otherwise invalidated. In this instance, cases (X), (O), and (A) in candidate (X, O, A) triple may be said to be citationally related. In aspects, data extractor 120 identifies all cases (A) citing (O) and may create an (X, O, A) triple for each of these cases.

At block 203, metadata is extracted from the candidate triples. In aspects, the metadata may include any of the text of the case, the text of case (A)'s citation of case (O), headnotes cited in the various cases, key numbers, etc. At optional block 204, training candidate (X, O, A) triples may be labeled as D (e.g., case (A) of the triple likely impacted by the overruling) or N (e.g., case (A) of the triple likely not impacted by the overruling). Block 204 may be optional at runtime because the operations at block 204 may be intended to be performed during classifier training operations. As noted above, the classifiers may be trained using annotated data and, in this case, the candidate (X, O, A) triples may be annotated by labeling them as either D or N, in order to use these labeled triples to train the classifiers. In aspects, the classifiers may include an established law classifier, and a main classifier as will be discussed in more detail below.

As the data extracted by data extractor 120 may be used to train the classifiers (e.g., the established law classifier and the main classifier), data sources 170 may be configured to ensure an adequate sample of data may be obtained from data sources 170 during data extraction. In aspects, the training set of data may be configured such that for an (X, O, A) triple the intersection of the set of key cited headnotes in (X) and (O) for the (X, O) pair and the key cited headnotes in (A) and (O) for the (A, O) pair is a non-empty set, thereby ensuring a reasonably balanced labeled set of triples (e.g., a labeled set with a similar number of D and N triples). In additional or alternative aspects, the training set of data may also include (X, O, A) triples that do not meet the above condition related to the key cited headnotes non-empty set.

Additionally, the distribution of cases (A) for the various (X, O) pairs may be skewed. For example, a few very popular cases that may be overruled may cover a large portion of the space of cases (A) for which an impliedly overruling determination may be made. In some embodiments, a relatively few number of sample triples (e.g., in order of 10s) for each one of the popular overruled cases may be obtained, and classifiers that generalize to other citing cases of these overruled cases may be built. In additional or alternative aspects, the set of training data may be expanded to include a random set of examples for less popular overruled cases to ensure a larger coverage of the space of overruled cases.

In aspects, the set of training data may include configuration to constrain the various types of cases, such as by date, jurisdiction, headnotes, popularity, etc. For example, the set of training data may include overruled cases with a date higher than some particular date. In addition, the set of training data may be constrained to cases (A) with a date earlier than the date of cases (X), as it is more likely that an earlier case citing a case that is overruled by a later case may be missed as potentially affected. In aspects, training data related to federal case law may be separated from training data related to state case law. In some cases, (X, O) pairs may or may not have a key cited headnotes in common. Similarly, (A, O) pairs may or may not have a key cited headnotes in common. In these cases, training data may include samples with (X, O) pairs or (A, O) pairs with headnotes in common, or may include samples with (X, O) pairs or (A, O) pairs with no headnotes in common. In yet other examples the training data may include a mixture of pairs with headnotes in common and pairs with no headnotes in common. In some embodiments, the training data may include only overruled cases with a higher degree of popularity than a predetermined popularity threshold. Popularity may refer to a number of cases (A) citing the overruled case, where the citing cases (A) may meet a date(A)<date(X) condition, and possibly the restriction on the overlap between the key cited headnotes assigned to the (X, O) and (A, O) citations.

Figure 3:
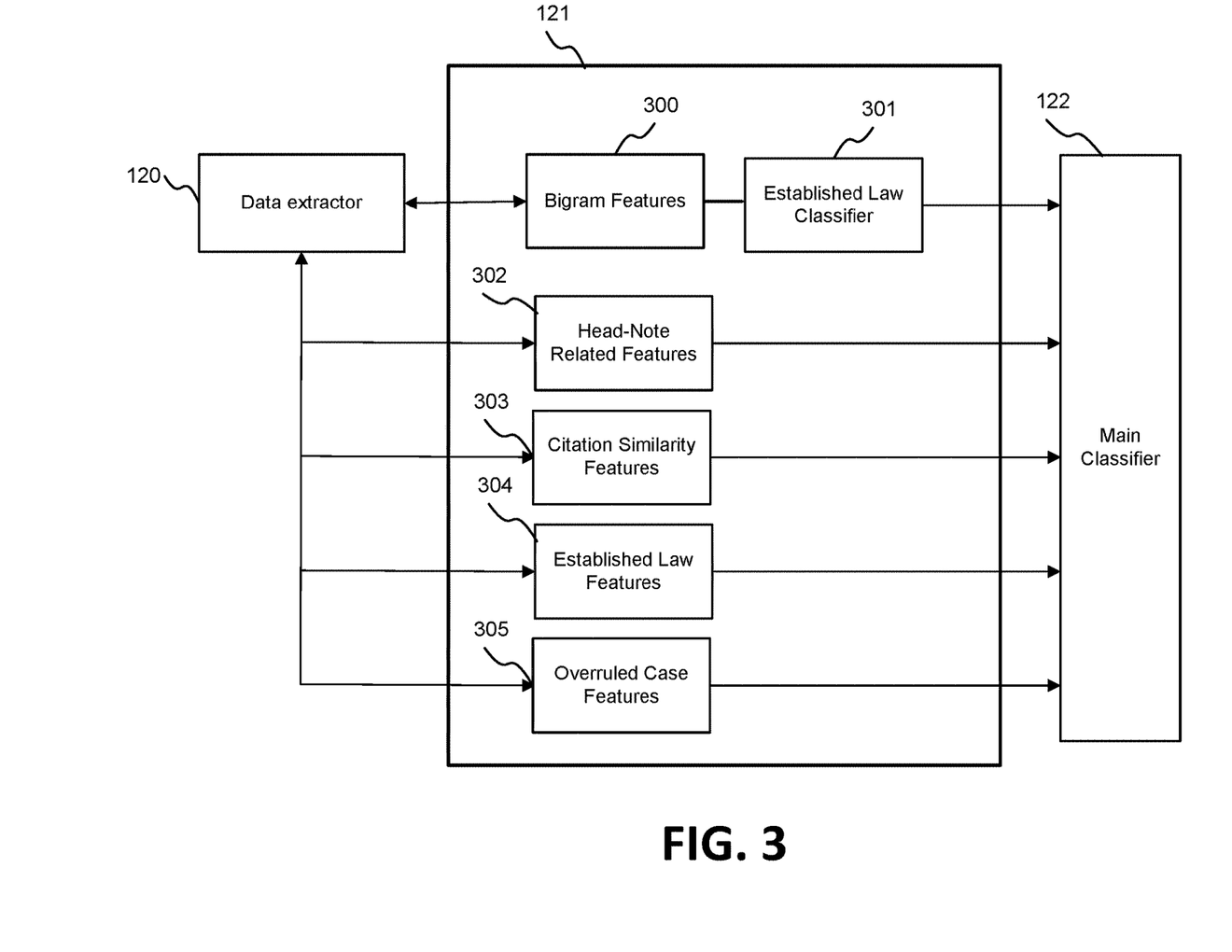
FIG. 3 shows a block diagram illustrating functionality of a feature generator for extracting features from candidate triples in accordance with aspects of the present disclosure.

With reference back to FIG. 1, feature generator 121 may be configured to extract features from the candidate (X, O, A) triples extracted by data extractor 120. In aspects, the extracted features may include natural language features that may be used to determine whether citing case (A) in a candidate (X, O, A) triple cites to overruled case (O) in reliance of the same issue/point of law for which overruling case (X) overruled case (O), and to determine whether citing case (A) cites overruled case (O) as established/good law. The functionality of feature generator 121 will now be discussed with respect to the block diagram illustrated in FIG. 3. FIG. 3 shows a block diagram illustrating functionality of feature generator 121 for extracting features from candidate triples in accordance with aspects of the present disclosure.

It is noted that the feature generator 121 may extract a significant number of features from (X, O, A) triples. In aspects, the features extracted by feature generator 121 may be divided into three groups of features. It will be appreciated that many other types of features may be extracted from the candidate (X, O, A) triples, and the discussion herein of the three groups of features is by way of illustration, and not limiting in any way. A first group of features may include issue-aligning features. Issue aligning features may include features that are based on or draw on metadata (e.g., metadata, headnotes, key numbers, etc.) and text segments (e.g., citation paragraphs) from all three cases (X), (O), and (A). One category of issue aligning features may include headnote-related features 302. These headnote-related features 302 may rely on headnotes and key number (e.g., key numbers associated with headnotes) to measure the similarity between the citation in the (X, O) pair and the citation in the (A, O) pair. In these features, a citation (e.g., a paragraph where a case cites another case) may be associated with a headnote. For example, for the (X, O) pair of an (X, O, A) triple, a particular paragraph of overruling case (X) may cite overruled case (O) (e.g., to explicitly overrule case (O), and/or to discuss a point of law for which case (O) is overruled). This citation paragraph in (X) may be associated with a first headnote. Similarly, for the (A, O) pair of the triple, a particular paragraph of overruling case (A) may cite overruled case (O) (e.g., to explicitly cite case (O), and/or to discuss a point of law for which case (O) is being cited by case (A)). This citation paragraph in (A) may be associated with a second headnote. In this case, headnote features of embodiments may measure the similarity between the first headnote and the second headnote to determine the similarity between the citation in the (X, O) pair and the citation in the (A, O) pair. Measuring the similarity between the citations in the two pairs of a triple may allow the system to determine whether citing case (A) cites to overruled case (O) in reliance of the same issue for which overruling case (X) overruled case (O). In aspects, a number of features of headnote-related features 302 may determine the similarity of the headnotes in the pairs of the triples by measuring the overlap between two sets of headnote IDs, or by measuring the overlap between the key numbers corresponding to the headnotes. Other features of headnote-related features 302 may capture the overall textual similarity between the headnotes. For example, these features may compare the actual text of the headnotes (e.g., the first headnote for the (X, O) pair and the second headnote for the (A, O) pair) to determine the textual similarity between the headnotes. In some aspects, some features of headnote-related features 302 may represent the text span of the headnote as a set of noun or verb phrases, and some headnote features may represent the text span as a set of n-grams. Additionally, some features of headnote-related features 302 may aggregate the pairwise similarity values over the two sets of headnote texts.

Another category of issue aligning features may include citation similarity features 303. Citation similarity features 303 may measure the similarity between the citation in the (X, O) pair and the citation in the (A, O) pair of a triple by examining the citation paragraphs within overruling case (X) and citing case (A). In some cases, there may be more than one citation paragraph in overruling case (X) and in citing case (A). In aspects, citation similarity features 303 may use heuristics to focus on the most relevant citation paragraph. For example, there may be a headnote in overruling case (X) that cites to overruled case (O). In this case, it may be determined that the citation associated with the headnote may be discussing the overruled issue, and the paragraph in overruling case (X) associated with the headnote may be deemed as the most relevant citation paragraph in overruling case (X), even if there are additional citation paragraphs. In the case where there may be no headnotes cited, the last paragraph in the opinion of overruling case (X) may be deemed to be the most relevant. For citing case (A), citation similarity features 303 may consider all citation paragraphs as being potentially relevant. In aspects, a number of features of citation similarity features 303 may concatenate citation paragraphs in citing case (A) into a single text span in the analysis. Some features of citation similarity features 303 may measure the similarity of each citation paragraph in citing case (A) to the citation paragraph in overruling case (X), and may then calculate an average or maximum value as the final similarity value. Some features of citation similarity features 303 may include bigram-based context text similarity features. These bigram-based features may analyze the text of the citation paragraphs within overruling case (X) and citing case (A), and may determine a number of words that are potentially overlapping. This may be done in a bigram format, in which a pair of words from a sentence is taken for each iteration of the analysis. In this sense, a two-word sliding window is used each time, and these features measure how many of those bigrams overlap in the citation text of the overruling case (X) and the citing case (A).

Another group of features that may be extracted by feature generator 121 may include established law features 304. Established law features 304 may include features that analyze text segments from citing case (A) of an (X, O, A) triple to determine whether there may be an indication in the language proximate the citation of overruled case (O) in citing case (A), which may indicate that citing case (A) considers overruled case (O) to be good/established law. Established law features 304 may include features related to the metadata of the cases. In aspects, the metadata of citing case (A) may include a depth of treatment of overruled case (O) within citing case (A). The depth of treatment metadata may summarize the depth/level of the discussion of overruled case (O) within citing case (A).

Yet another group of features that may be extracted by feature generator 121 may include overruled case features 305. Overruled case features 305 may include features that may analyze aspects of the overruled case. In aspects, overruled case features 305 may include features that determine a D/N ratio for the overruled case (O) of an (X, O, A) triple. These features may determine the ratio of D labeled cases for each overruled case (O), as observed in the training examples (X, O, A) for that overruled case (O). In aspects, different overruled cases (O) in the training annotated data may have varying numbers of corresponding D versus N classified triples, with some triples biased towards either the D or the N class. In other aspects, other overruled cases (O) may have a more balanced distribution of D versus N classified triples with which they are associated. In these cases, a rough probability is known of how many citing cases (A) in the training data, given overruled case (O), have been labeled as D and how many have been labeled N. The D/N ratio may then be used as signal of how likely a new citing case, given overruled case (O), may be a D or an N. The ratio may be provided as a feature of the (X, O, A) triple.

Feature generator 121 may also extract features using established law classifier 301. In aspects, established law classifier 301 may be configured to determine the probability that a citing case (A) in an (X, O, A) triple is citing overruled case (O) as good/established law. Established law classifier may make the probability determination by analyzing and interpreting the language proximate the citation of overruled case (O) in citing case (A), which may indicate that citing case (A) considers overruled case (O) to be good/established law. In aspects, the functionality of established law classifier 301 may assume that points of law in the (X, O) pair and the (A, O) pair align (e.g., citing case (A) cites overruled case (O) for reliance on the same point of law for which overruling case (X) overrules case (O)). In some aspects, established law classifier 301 may use features based on the training data of an embodiment. The number of features used by established law classifier 301 may be in the order of tens of thousands. In aspects, established law classifier 301 may use bigram features 300 as input. Bigram features 300 may be features extracted, using a bigram format as described above, from either training candidate (X, O, A) triples (e.g., in classifier training operations) or from runtime candidate (X, O, A) triples. In any case, the bigram features may be fed into the established law classifier 301.

In embodiments, bigrams may be extracted using several text spans around the citation(s) of overruled case (O) within citing case (A). One of these text spans may include the entire citing paragraph. Another of the text spans may include sentences in the immediate vicinity of the citation, which may include the sentence where the citation appears, plus any sentences before and after the sentence, provided the additional sentences do not include a citation to a different case. Yet another one of the text spans may include a number of tokens (e.g., ten tokens) immediately before the citation. As used herein, a token may refer to a word, a grammatical symbol (e.g., comma, period, etc.), or any other grammatical element. In aspects, for each of these span types, which may include multiple spans across several citation paragraphs, a separate set of bigram features may be derived. In some cases, the bigrams may be constrained to a cutoff, such that more than a particular number of consecutive occurrences (e.g., in the order of 1s) in the training data, the excess bigrams are cutoff. In embodiments, the established law classifier 301 may use a logistic regression with L2 regularization classification algorithm, and the output probability for the classifier may be used as established law classifier 301's output feature value for a respective citing case (A).

In some aspects, training of established law classifier 301 may use a subset of the annotated training data. This functionality may be different than the functionality of main classifier 122, discussed in more detail below. In aspects, the sample of citing cases (A) per overruled case (O) for training established law classifier 301 may be selected by (1) considering only (X, O, A) triples for which a majority of annotators (e.g., a threshold percentage of annotators) have indicated that citing case (A) cites overruled case (O) as reliance for the overruled point of law, and then (2) for each overruled case (O), selecting sample data whose D/N distribution follows a target percentage of D classifications, determined based on the average D/N distribution across the set selected in (1).

In embodiments, this allows the established law classifier 301 not to memorize the topics of specific overruled cases, and thereby improve performance when analyzing overruled cases that may have a significant bias. In this sense, established law classifier 301 may be focused on the language of the citation text that indicates the nature of the citation of overruled (O). The restriction on overruled case (O)-specific D/N distribution in (2) above may be enforced by sampling D-classified cases and N-classified cases for the particular overruled case such that the actual distribution of D/N for the particular overruled case is as close to the target ratio as possible, when there may be at least one D-classified case and at least one N-classified case for the given overruled case, and by sampling, when there may be only D-classified cases or only N-classified cases, one citing (A) as often as would be expected given the D/N ratio. For example, given a target D/N ratio of 80%, then, for an overruled case (O) that may be associated with only D-classified triples, one citing case (A) would be sampled 80% of the time from the samples associated with the overruled case (O). For an overruled case (O) that may be associated with multiple D-classified triples and exactly one N-classified triples, then the sample data would include the one N-classified case, as well as 4 randomly sampled D-classified cases, this being the maximum number of D-classified cases that may be sampled for the overruled case (O) while still maintaining an 80% D/N ratio. This approach to sampling provides more significant amounts of training data than an alternative approach that includes sampling exactly one citing case (A) per overruled case (O), while preserving the same good properties (e.g., not being too biased towards highly popular overruled cases (O) with many citing cases (A) samples).

With reference back to FIG. 1, main classifier 122 may be configured to receive features extracted from (X, O, A) triples by feature generator 121, and to classify the (X, O, A) triples into a D class or an N class, indicating the probability that citing case (A) is impliedly overruled by overruling case (X) based on the citational relationship between citing case (A) and overruled case (O). As noted above, an N-classification may indicate a probability that the triple may not be impacted by the overruling of case (O). A D-classification may indicate a probability that the triple may be impacted by the overruling of case (O). In aspects, for each (X, O, A) triple classified by main classifier 122, main classifier 122 may generate a risk score, the risk score indicating the probability that the citing case (A) of the (X, O, A) triple may be impliedly overruled by case (X) overruling case (O). In aspects, a threshold value may be used to determine whether to classify the (X, O, A) triple as N or D. When the risk score for an (X, O, A) triple meets or exceeds the threshold value, the (X, O, A) triple may be classified as a D triple, and when the risk score for the (X, O, A) triple does not exceed the threshold value, the (X, O, A) triple may be classified as an N triple. In a sense, a D triple indicates that the citing case (A) of the triple has a probability of not being good law (e.g., impliedly overruled). In some embodiments, an indication of the classification of the citing case as potentially not good law (e.g., a particular color flag, a value, a letter grade, and/or any other type of indication that conveys to a user that there is a probability that the case may have been impliedly overruled) may be generated and stored (e.g., in database 113). The indication may be subsequently presented to a user.

It will be appreciated that, in some cases, the implied overruling of the citing case (A) may be with respect to a particular point of law. For example, a legal issue discussed within the citing case (A), and for which overruled case (O) may have been cited, may have received negative treatment in the overruling case (X). In these cases, in addition, or in the alternative, to the indication that the citing case may be impliedly overruled, server 110 may be configured to provide a paragraph similarity indicator, to identify similar paragraphs in citing case (A), overruled case (O), and overruling case (X). This may allow a user to identify the citation paragraphs, or the contextual portions of text within citing case (A), which discuss a point of law and are similar to the paragraphs in which the same point of law may have received negative treatment, and which may have led to classifying citing case (A) as an impliedly overruled case. In aspects, the indication of the similar paragraphs may include highlighting the citation paragraphs in the citing case (A), and the corresponding text in the overruled case (O) and the overruling case (X).

In aspects, main classifier 122 may be based on a classification algorithm that uses a classification function F(X, O, A):{D, N}. In this sense, main classifier 122 may label an (X, O, A) triple with a label D or N, by determining, based on the features received from feature generator 121, whether there is a high risk, or whether there is a low risk or no risk, that citing case (A) may be impliedly overruled by overruling case (X). In some implementations, the classification algorithm may include a Random Forest classifier to classify the (X, O, A) triples. Feature selection, e.g., top select features that may be provided to the main classifier, may be performed through ranking of the features extracted by feature generator 121 according to the relevance of the features to the final classification task, and by removing low-ranked features. In aspects, as noted above, main classifier 122 may be trained using the training data (e.g., training features extracted from annotated training data) as described above. In some aspects, the training data may be used to grow the Random Forest classifier. During runtime, the trained classifier may be applied to runtime (X, O, A) triples in order to classify the triples in accordance with the description above.

Figure 4:
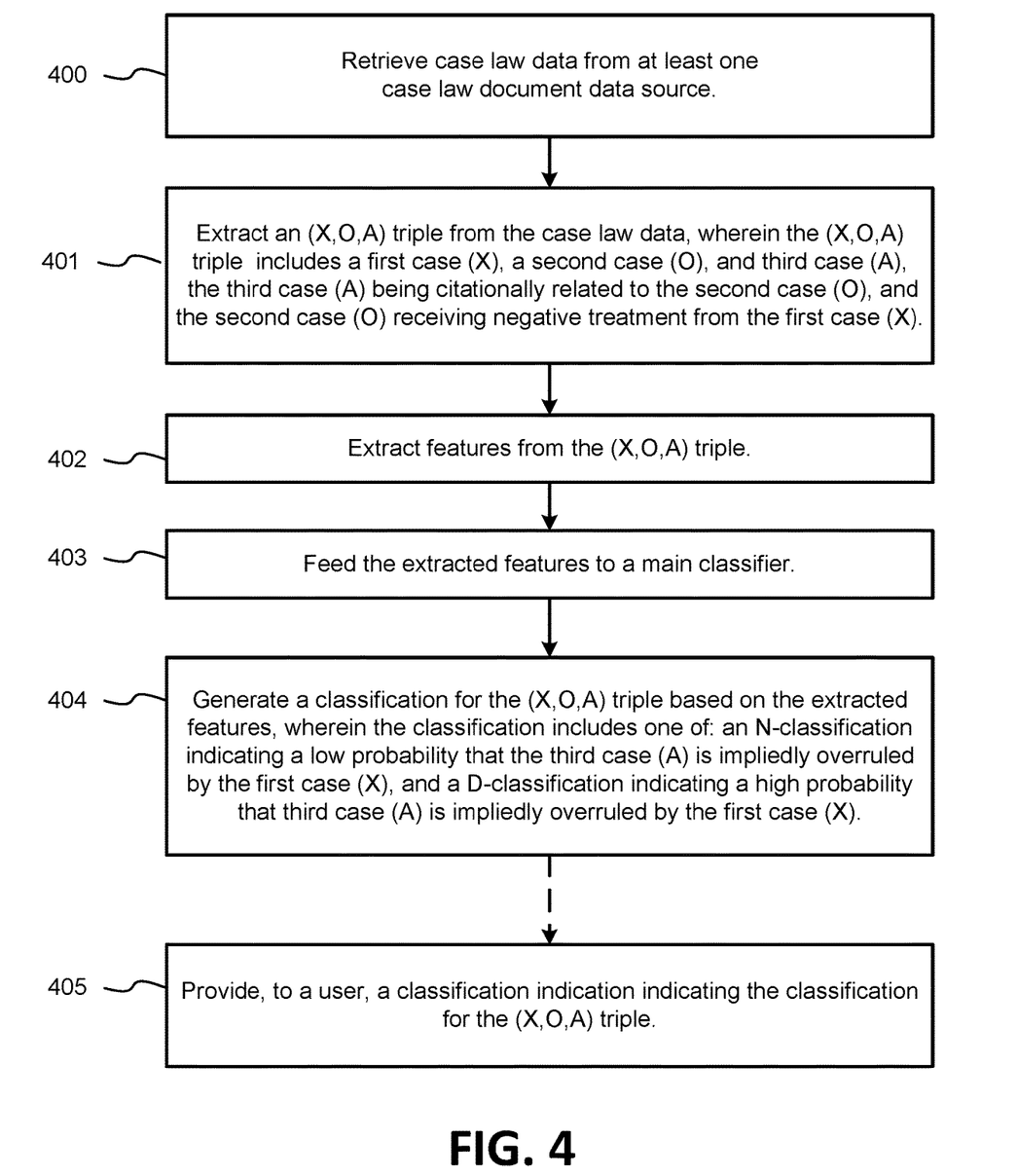
FIG. 4 shows an operational flow diagram illustrating example blocks executed to implement aspects of the present disclosure.

FIG. 4 shows a high level flow diagram of operation of a system configured in accordance with aspects of the present disclosure for analyzing citationally related content and identifying, based on the analysis, a risk of impliedly overruled content, in accordance with embodiments of the present application. For example, the functions illustrated in the example blocks shown in FIG. 4 may be performed by system 100 of FIG. 1 according to embodiments herein.

At block 400, case law data is received. The case law data may be received from at least one source document source, such as from data sources 170. In aspects, the case law data may include case decisions and/or court opinions, and may discuss and/or rely upon particular legal issues or points of law. In some cases, a case may cite another case for a particular point of law, and/or both cases may discuss and/or rely upon the same point of law. In aspects, the case law data may include cases overruling other cases, and/or giving negative treatment to a particular point of law, which point of law may be recited in another case.

At block 401, an (X, O, A) triple may be extracted from the case law data received at block 400. In aspects, the (X, O, A) triple may include a combination of a first case (X), a second case (O), and third case (A), wherein the first case overrules or abrogates the second case, and wherein the third case cites, is cited by, and/or relies on the same point of law as the second case. In some aspects, the first case may not explicitly overrule the second case, but may provide a negative treatment of a point of law discussed in the second case. In embodiments, the third case may cite the second case for reliance on a particular point of law, and/or the first case may overrule the second case for the same particular point of law. In aspects, extracting an (X, O, A) triple may include determining the citational relationship between the cases, the citational relationship including the overruling, citing, being cited by, relying on another case as established law with respect to some point of law, and/or discussing the same point of law. In some aspects, extracting the (X, O, A) triple may include extracting metadata for the various cases in the (X, O, A) triple, and/or labeling the (X, O, A) triple as a training triple.

At block 402, features are extracted from the (X, O, A) triple. In some aspects, the extracted features may include any of: issue aligning features, citation similarity features, established law features, overruled case features, etc. In aspects, the features extracted from the (X, O, A) triple may include features determining whether citing third case (A) cites second case O as good/established law for the particular point of law. In aspects, this established law determination may include applying an established law classifier that may analyze the citation text within the third case (A) and/or the relevant text of second case O to determine textual similarities between the cases. In some aspects, the established law classifier may analyze the language proximate, or around, the citation text within the third case (A) to determine contextual similarities between the cases. At block 403, the extracted features are fed into a main classifier.

At block 404, the main classifier generates a classification for the (X, O, A) triple based on the extracted features. In aspects, the classification of the (X, O, A) triple may include classifying the (X, O, A) triple into a D or N classification, wherein an N classification may indicate a probability that the (X, O, A) triple may not be impacted by the overruling of first case (O), and a D classification may indicate a probability that the (X, O, A) triple may be impacted by the overruling of first case (O). In aspects, generating the classification for the (X, O, A) triple may include generating a risk score indicating the probability that the citing third case (A) of the (X, O, A) triple may be impliedly overruled by the first case (X) overruling the second case (O). In aspects, a threshold value may be used to determine whether to classify the (X, O, A) triple as N or D. When the risk score for an (X, O, A) triple meets or exceeds the threshold value, the (X, O, A) triple may be classified as a D triple, and when the risk score for the (X, O, A) triple does not exceed the threshold value, the (X, O, A) triple may be classified as an N triple. Generating the classification for the (X, O, A) triple may include using a Random Forest classifier.

In embodiments, generating the classification for the (X, O, A) triple may include performing feature selection prior to the classification. In these embodiments, the extracted features may be ranked, e.g., based on the relevance of the features to the final classification task. The ranked features may then be trimmed, e.g., by selecting the N highest-ranked features, or by removing the K lowest-ranked features. The trimmed set of ranked features may then be fed to the classifier.

At optional block 405, a classification indication indicating the classification for the (X, O, A) triple is provided to a user. In aspects, the classification indication may identify the citing third case (A) as potentially not good law. In aspects, the classification indication may be the actual classification (e.g., N or D) and/or may include one or more of: a flag, a particular color flag, a value, a letter grade, and/or any other type of indication that conveys that there is a probability that the third case (A) may have been impliedly overruled. In aspects, a paragraph similarity indicator may also be provided to the user. The paragraph similarity indicator may identify paragraphs in citing third case (A), or in contextual portions of text within citing third case (A), which discuss a point of law for which second case (O) was cited by third case (A), and which may have received negative treatment by first case (X). In aspects, the indication of the similar paragraphs may include highlighting the citation paragraphs in the citing third case (A). Block 405 is optional because during classifier training operations, the case law data may be training data and the classification of the (X, O, A) triple may be previously known (e.g., by a manual annotator, or an automated annotating system). As such, the operations at block 405 may be runtime operations.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1-4 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method comprising:
    providing training data to a machine learning (ML) main classifier to train the ML main classifier, the training data based on annotated candidate (X,O,A) triples that are annotated to indicate corresponding classifications;
    receiving case law data from at least one case law document data source;
    extracting an (X,O,A) triple from the case law data, wherein the (X,O,A) triple includes a first case (X), a second case (O), and third case (A), the third case (A) being citationally related to the second case (O), and the second case (O) receiving negative treatment from the first case (X);
    extracting at least one feature from the (X,O,A) triple;
    feeding the extracted at least one feature to the ML main classifier, the ML main classifier trained to output classifications that correspond to (X,O,A) triples;
    generating, by the ML main classifier, a classification for the (X,O,A) triple based on the extracted at least one feature, wherein the classification includes one of:
        an N-classification indicating a low probability that the third case (A) is impliedly overruled by the first case (X); and
        a D-classification indicating a high probability that the third case (A) is impliedly overruled by the first case (X); and
    outputting a visual indication of the classification for the (X,O,A) triple.

2. The method of claim 1, wherein the visual indication of the classification for the (X,O,A) triple comprises a colored flag, a numerical value, or a letter grade.

3. The method of claim 1, wherein the third case (A) being citationally related to the second case (O) includes at least one of: the third case (A) citing the second case (O), the third case (A) being cited by the second case (O), the third case (A) relying upon the second case (O) as established law with respect to a point of law, and the third case (A) and the second case (O) discussing a same point of law, and wherein the negative treatment includes at least one of: the second case (O) being overruled with respect to the point of law, and the point of law in the second case (O) receiving the negative treatment.

4. The method of claim 1, wherein the extracted at least one feature includes one or more of: issue aligning features, citation similarity features, established law features, overruled case features, and an output from an ML established law classifier.

5. The method of claim 4, wherein the ML established law classifier is trained to determine whether the third case (A) cites, in reliance of a point of law, the second case (O) as established law for the point of law.

6. The method of claim 5, wherein the ML established law classifier is trained to analyze a portion of text within the third case (A) related to the point of law to determine at least one of textual similarities and contextual similarities between the third case (A) and the second case (O).

7. The method of claim 1, wherein the generating the classification for the (X,O,A) triple includes generating a risk score for the (X,O,A) triple indicating a probability that the third case (A) is impliedly overruled by the first case (X) overruling the second case (O).

8. The method of claim 7, further comprising comparing the probability to a predetermined threshold, wherein the low probability indicated by the N-classification does not exceed the predetermined threshold, and wherein the high probability indicated by the D- classification meets or exceeds the predetermined threshold.

9. The method of claim 1, wherein the feeding the extracted at least one feature to the ML main classifier includes performing feature selection on the extracted at least one feature, the feature selection including:

ranking the extracted at least one feature based on relevance of the extracted at least one feature to the classification of the (X,O,A) triple to generate a set of ranked features;
trimming the set of ranked features; and
feeding the trimmed set of ranked features to the ML main classifier.

10. The method of claim 9, wherein trimming the set of ranked features includes one of:
selecting N highest-ranked features from the set of ranked features for the trimmed set of ranked features; and
removing a K lowest-ranked features from the set of ranked features to generate the trimmed set of ranked features.

11. A system comprising:
a data extractor configured to:
receive case law data from at least one case law document data source; and
extract an (X,O,A) triple from the case law data, wherein the (X,O,A) triple includes a first case (X), a second case (O), and third case (A), the third case (A) being citationally related to the second case (O), and the second case (O) receiving negative treatment from the first case (X);
a feature generator configured to:
extract at least one feature from the (X,O,A) triple; and
feed the extracted at least one feature to a machine learning (ML) main classifier, the ML main classifier trained to output classifications that correspond to (X,O,A) triples, wherein the training data used to train the ML main classifier is based on annotated candidate (X,O,A) triples that are annotated to indicate corresponding classifications; and
the ML main classifier configured to:
generate a classification for the (X,O,A) triple based on the extracted at least one feature, wherein the classification includes one of:
an N-classification indicating a low probability that the third case (A) is impliedly overruled by the first case (X); and
a D-classification indicating a high probability that the third case (A) is impliedly overruled by the first case (X); and
output a visual indication of the classification for the (X,O,A) triple.

12. The system of claim 11, wherein the third case (A) being citationally related to the second case (O) includes at least one of: the third case (A) citing the second case (O), the third case (A) being cited by the second case (O), the third case (A) relying upon the second case (O) as established law with respect to a point of law, and the third case (A) and the second case (O) discussing a same point of law, and wherein the negative treatment includes at least one of: the second case (O) being overruled with respect to the point of law, and the point of law in the second case (O) receiving the negative treatment.

13. The system of claim 11, wherein the extracted at least one feature includes one or more of: issue aligning features, citation similarity features, established law features, overruled case features, and an output from an ML established law classifier.

14. The system of claim 13, wherein the ML established law classifier is trained to determine whether the third case (A) cites, in reliance of a point of law, the second case (O) as established law for the point of law based on at least one of textual similarities and contextual similarities between the third case (A) and the second case (O).

15. The system of claim 11, wherein the configuration of the ML main classifier to generate the classification for the (X,O,A) triple includes configuration of the ML main classifier to generate a risk score for the (X,O,A) triple indicating a probability that the third case (A) is impliedly overruled by the first case (X) overruling the second case (O), and wherein the ML main classifier is further configured to compare the probability to a predetermined threshold, wherein the low probability indicated by the N-classification does not exceed the predetermined threshold, and wherein the high probability indicated by the D-classification meets or exceeds the predetermined threshold.

16. The system of claim 11, wherein the configuration of the feature generator to feed the extracted at least one feature to the ML main classifier includes configuration of the feature generator to perform feature selection on the extracted at least one feature, the configuration of the feature generator to perform the feature selection including configuration of the feature generator to:
rank the extracted at least one feature based on relevance of the extracted at least one feature to the classification of the (X,O,A) triple to generate a set of ranked features;
trim the set of ranked features; and
feed the trimmed set of ranked features to the ML main classifier.

17. A computer-based tool including non-transitory computer readable media having stored thereon computer code which, when executed by a processor, causes a computing device to perform operations comprising:
providing training data to a machine learning (ML) main classifier to train the ML main classifier, the training data based on annotated candidate (X,O,A) triples that are annotated to indicate corresponding classifications;
receiving case law data from at least one case law document data source;
extracting an (X,O,A) triple from the case law data, wherein the (X,O,A) triple includes a first case (X), a second case (O), and third case (A), the third case (A) being citationally related to the second case (O), and the second case (O) receiving negative treatment from the first case (X);
extracting at least one feature from the (X,O,A) triple;
feeding the extracted at least one feature to the ML main classifier, the ML main classifier trained to output classifications that correspond to (X,O,A) triples;
generating, by the ML main classifier, a classification for the (X,O,A) triple based on the extracted at least one feature, wherein the classification includes one of:
an N-classification indicating a low probability that the third case (A) is impliedly overruled by the first case (X); and
a D-classification indicating a high probability that the third case (A) is impliedly overruled by the first case (X); and
outputting a visual indication of the classification for the (X,O,A) triple.

18. The method of claim 1, further comprising highlighting one or more citation paragraphs in a display of the third case (A) and one or more similar paragraphs in the first case (X) and the second case (O) based on the classification.

19. The method of claim 1, wherein the ML main classifier comprises a random forest ML classifier.

20. The computer-based tool of claim 17, wherein the ML main classifier comprises a random forest ML classifier, and wherein the operations comprise highlighting one or more citation paragraphs in a display of the third case (A) and one or more similar paragraphs in the first case (X) and the second case (O) based on the classification.

* * * * *